US009229961B2

(12) United States Patent
Bestgen et al.

(10) Patent No.: US 9,229,961 B2
(45) Date of Patent: *Jan. 5, 2016

(54) DATABASE MANAGEMENT DELETE EFFICIENCY

(71) Applicant: International Business Machines Corporation, Armonk, NY (US)

(72) Inventors: Robert J. Bestgen, Rochester, MN (US); Daniel E. Beuch, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/795,262

(22) Filed: Mar. 12, 2013

(65) Prior Publication Data

US 2014/0229429 A1    Aug. 14, 2014

Related U.S. Application Data

(63) Continuation of application No. 13/763,971, filed on Feb. 11, 2013.

(51) Int. Cl.
*G06F 17/30* (2006.01)

(52) U.S. Cl.
CPC ........ *G06F 17/30289* (2013.01); *G06F 17/303* (2013.01); *G06F 17/30955* (2013.01)

(58) Field of Classification Search
CPC ................................................ G06F 17/30289
See application file for complete search history.

(56) References Cited

U.S. PATENT DOCUMENTS

| | | | | | |
|---|---|---|---|---|---|
| 5,535,385 | A | * | 7/1996 | Griffin et al. | 1/1 |
| 5,826,257 | A | * | 10/1998 | Snelling, Jr. | 1/1 |
| 5,926,813 | A | * | 7/1999 | Chaudhuri et al. | 1/1 |
| 5,950,186 | A | * | 9/1999 | Chaudhuri et al. | 1/1 |
| 6,026,406 | A | | 2/2000 | Huang et al. | |
| 6,047,298 | A | * | 4/2000 | Morishita | 715/236 |
| 6,098,075 | A | * | 8/2000 | Becraft et al. | 1/1 |

(Continued)

FOREIGN PATENT DOCUMENTS

EP    2144177 A2    1/2010

OTHER PUBLICATIONS

Graefe, G., "Sorting and Indexing with Partitioned B-Trees", Proceedings of the 2003 CIDR Conference, pp. 1-13.

(Continued)

*Primary Examiner* — James Trujillo
*Assistant Examiner* — Hubert Cheung
(74) *Attorney, Agent, or Firm* — Scott A. Berger; James R. Nock (57) ABSTRACT

A method, system, and computer program product to efficiently delete data from a database is disclosed. The method, system, and computer program product may include structuring the database to have a plurality of tables having indexes to related rows and having keys with key values associated with particular rows. The method, system, and computer program product may include deleting rows in the database tables by deleting keys in indexes related to the rows in an order such that corresponding rows are deleted based on relation to the keys. The method, system, and computer program product may include ordering the rows to be deleted based on concepts such as hierarchy, spatial locality, temporal locality, frequency of access, number of rows, and value uniqueness. Comparatively closely related relationships may be prioritized to be deleted.

15 Claims, 8 Drawing Sheets

(56) References Cited

U.S. PATENT DOCUMENTS

| | | | |
|---|---|---|---|
| 6,651,075 B1* | 11/2003 | Kusters et al. | 1/1 |
| 6,675,157 B1* | 1/2004 | Mitchell | 1/1 |
| 7,490,084 B2 | 2/2009 | Kothuri et al. | |
| 7,593,341 B1* | 9/2009 | Buriol et al. | 370/238 |
| 7,644,107 B2 | 1/2010 | Neagovici-Negoescu et al. | |
| 8,032,503 B2 | 10/2011 | Bouloy et al. | |
| 8,140,495 B2 | 3/2012 | Carlin et al. | |
| 8,161,015 B2 | 4/2012 | Kennedy et al. | |
| 8,352,422 B2 | 1/2013 | Prahlad et al. | |
| 8,504,758 B1* | 8/2013 | McHugh et al. | 711/100 |
| 2002/0052872 A1* | 5/2002 | Yada | 707/6 |
| 2002/0198867 A1 | 12/2002 | Lohman et al. | |
| 2003/0037042 A1* | 2/2003 | Kametani | 707/3 |
| 2003/0126116 A1 | 7/2003 | Chen et al. | |
| 2005/0283485 A1* | 12/2005 | Blaicher et al. | 707/100 |
| 2007/0124303 A1* | 5/2007 | Dettinger et al. | 707/9 |
| 2007/0174309 A1* | 7/2007 | Pettovello | 707/100 |
| 2007/0280199 A1* | 12/2007 | Rong | 370/351 |
| 2008/0077584 A1* | 3/2008 | Bachmann et al. | 707/5 |
| 2008/0098020 A1* | 4/2008 | Gupta et al. | 707/101 |
| 2009/0055638 A1* | 2/2009 | Nakano et al. | 713/1 |
| 2009/0063400 A1 | 3/2009 | Borkar et al. | |
| 2009/0064160 A1 | 3/2009 | Larson et al. | |
| 2009/0210413 A1* | 8/2009 | Hayashi et al. | 707/5 |
| 2010/0036864 A1* | 2/2010 | Augenstein et al. | 707/102 |
| 2010/0106682 A1 | 4/2010 | Pauly | |
| 2010/0161553 A1* | 6/2010 | Park et al. | 707/610 |
| 2011/0071986 A1* | 3/2011 | Schmidt et al. | 707/684 |
| 2012/0016881 A1 | 1/2012 | Hrle et al. | |
| 2012/0136869 A1* | 5/2012 | Kaufmann et al. | 707/741 |
| 2013/0185281 A1* | 7/2013 | Joppa et al. | 707/714 |
| 2013/0268498 A1* | 10/2013 | Sisco et al. | 707/692 |
| 2013/0275367 A1* | 10/2013 | Shuma et al. | 707/609 |
| 2013/0318131 A1* | 11/2013 | Reisman | 707/813 |
| 2014/0172783 A1 | 6/2014 | Suzuki et al. | |

OTHER PUBLICATIONS

RD 303005 A, Jul. 1989.

Bestgen, R., et al., "Management of Searches in a Database System", U.S. Appl. No. 13/793,451, filed Mar. 11, 2013.

Bestgen, R., et al., "Management of Searches in a Database System", U.S. Appl. No. 13/833,288, filed Mar. 15, 2013.

Bestgen, R., et al, "Management of Updates in a Database System", U.S. Appl. No. 13/793,216, filed Mar. 11, 2013.

Bestgen, R., et al, "Management of Updates in a Database System", U.S. Appl. No. 13/833,016, filed Mar. 15, 2013.

Bestgen, R., et al., "Database Management Delete Efficiency", U.S. Appl. No. 13763,971, filed Feb. 11, 2013.

* cited by examiner

Database
232A

Table 310

| Record# | Account# |
|---|---|
| 1 | 2112R |
| 2 | 1703O |
| 3 | 2619Y |
| 4 | 1232G |
| 5 | 1498B |
| 6 | 2334P |
| 7 | 1981W |
| 8 | 2827B |

Index 311

- 321 — Node1
- 322 — Node2
- 323 — Node3
- 324 — Node4
- 325 — Node5
- 326 — Node6
- 327 — Node7
- 328 → Node8 1232G
- 329 → Node9 1498B
- 330 → Node10 1703O
- 331 → Node11 1981W
- 332 → Node12 2112R
- 333 → Node13 2334P
- 334 → Node14 2619Y
- 335 → Node15 2827B

DATABASE MANAGEMENT DELETE EFFICIENCY

CROSS-REFERENCE TO RELATED APPLICATIONS

This application is a continuation of co-pending U.S. patent application Ser. No. 13/763,971, filed Feb. 11, 2013. The aforementioned related patent application is herein incorporated by reference in its entirety.

TECHNICAL FIELD

This disclosure relates generally to computing systems and, more particularly, relates to database management systems.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database.

A database may not be able to grow indefinitely. A database administrator may desire to purge data from the database. Deleting a large amount of data may take an amount of time that is not insignificant. The database administrator may have a small maintenance window. The maintenance may need to occur in real-time while applications remain active. It may be desirable for maintenance such as deleting data to be performed efficiently.

SUMMARY

A method, system, and computer program product to efficiently delete data from a database is disclosed. The method, system, and computer program product may include structuring the database to have a plurality of tables having indexes to related rows and having keys with key values associated with particular rows. The method, system, and computer program product may include deleting rows in the database tables by deleting keys in indexes related to the rows in an order such that corresponding rows are deleted based on relation to the keys. The method, system, and computer program product may include ordering the rows to be deleted based on concepts such as hierarchy, spatial locality, temporal locality, frequency of access, number of rows, and value uniqueness. Comparatively closely related relationships may be prioritized to be deleted.

Aspects of the disclosure may include structuring a database that may include one or more tables and one or more indexes. Aspects of the disclosure may speed-up SQL DELETE operations over tables with many indexes. Aspects of the disclosure may include the SQL optimizer taking into consideration the key structure of the indexes. Aspects of the disclosure may include the optimizer processing the rows to be operated-on in an order relating to the key structure. Aspects of the disclosure may order (e.g., sort, organize, arrange) rows (e.g., records, entries) to be deleted. Aspects of the disclosure may reduce the number of times a given index page is revisited. Aspects of the disclosure may promote efficiency when indexes have similar leading keys. Aspects of the disclosure may reduce the disclosure may reduce I/O on indexes. Aspects of the disclosure may reduce overall input-output (I/O) of SQL DELETE operations.

DETAILED DESCRIPTION

A database may not be able to grow indefinitely. A database administrator may desire to purge data from the database. Deleting a large amount of data may take an amount of time that is not insignificant. The database administrator may have a small maintenance window. The maintenance may need to occur in real-time while applications remain active. It may be desirable for maintenance such as deleting data to be performed efficiently.

A time-consuming aspect of maintenance in the form of a mass-delete may be index maintenance. In deleting one or more rows from a table, indexes associated with the one or more rows may be maintained in real-time. Real-time maintenance may enable the indexes to remain available for query access. Significant input-output (I/O) may result depending on factors such as memory size and the size of the indexes over the table. Random access to bring into memory the appropriate pages of the indexes may result as rows are deleted from the table. A given index page may need to be revisited multiple times, which may result in a fault into memory during an execution of a delete statement such as SQL DELETE. Reducing the number of times a given index page is revisited may result in efficiently deleting data.

Aspects of the disclosure may include structuring a database that may include one or more tables and one or more indexes. Aspects of the disclosure may speed-up SQL DELETE operations over tables with many indexes. Aspects of the disclosure may include the Structured Query Language (SQL) optimizer taking into consideration the key structure of the indexes. Aspects of the disclosure may include the optimizer processing the rows to be operated-on in an order relating to the key structure. Aspects of the disclosure may order (e.g., sort, organize, arrange) rows (e.g., records, entries) to be deleted. Aspects of the disclosure may reduce the number of times a given index page is revisited. Aspects of the disclosure may promote efficiency when indexes have similar leading keys. Aspects of the disclosure may reduce I/O on indexes. Aspects of the disclosure may reduce overall I/O of SQL DELETE operations.

Figure 1:
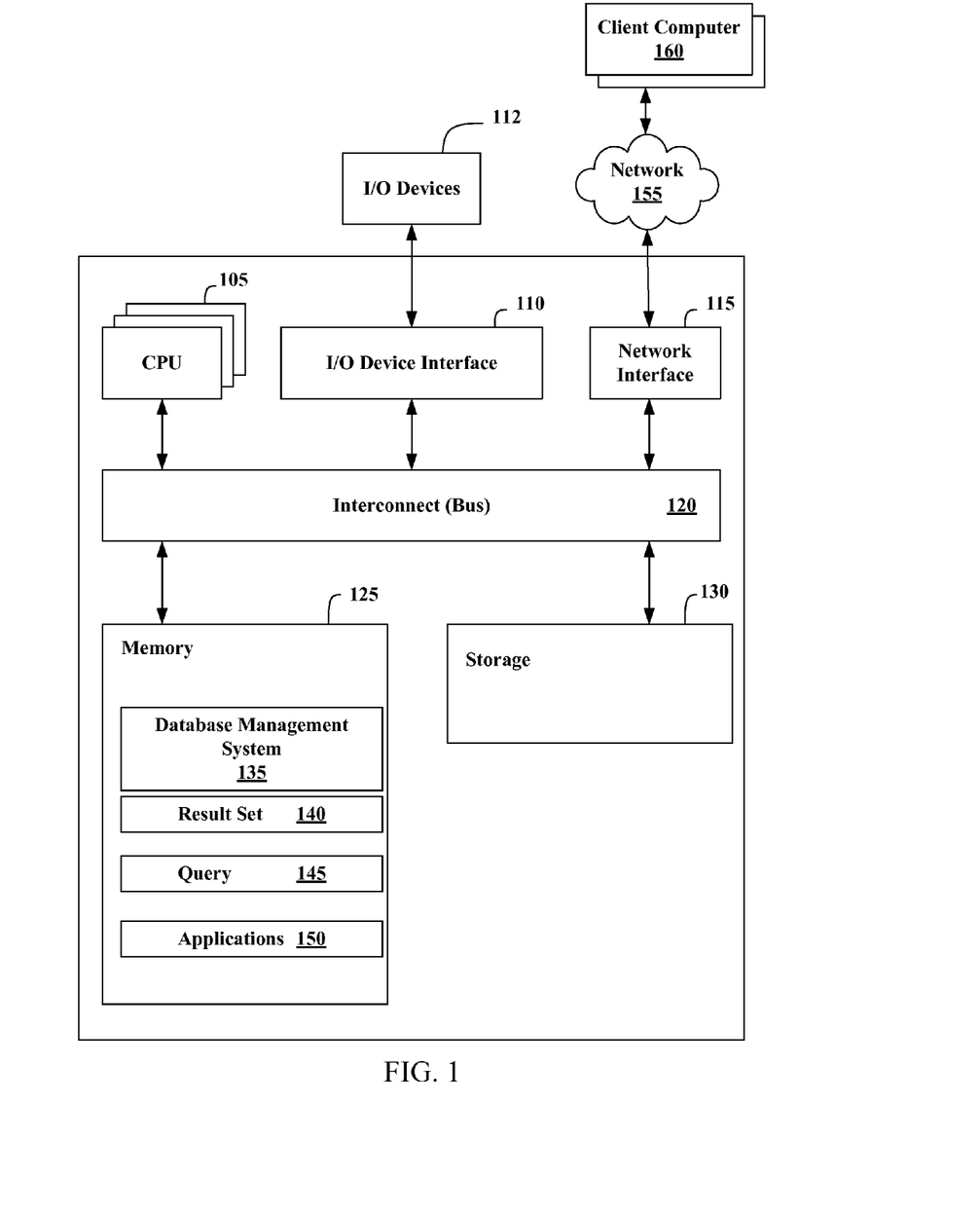
FIG. 1 illustrates an example representation of a computer system connected to a client computer via a network according to an embodiment.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
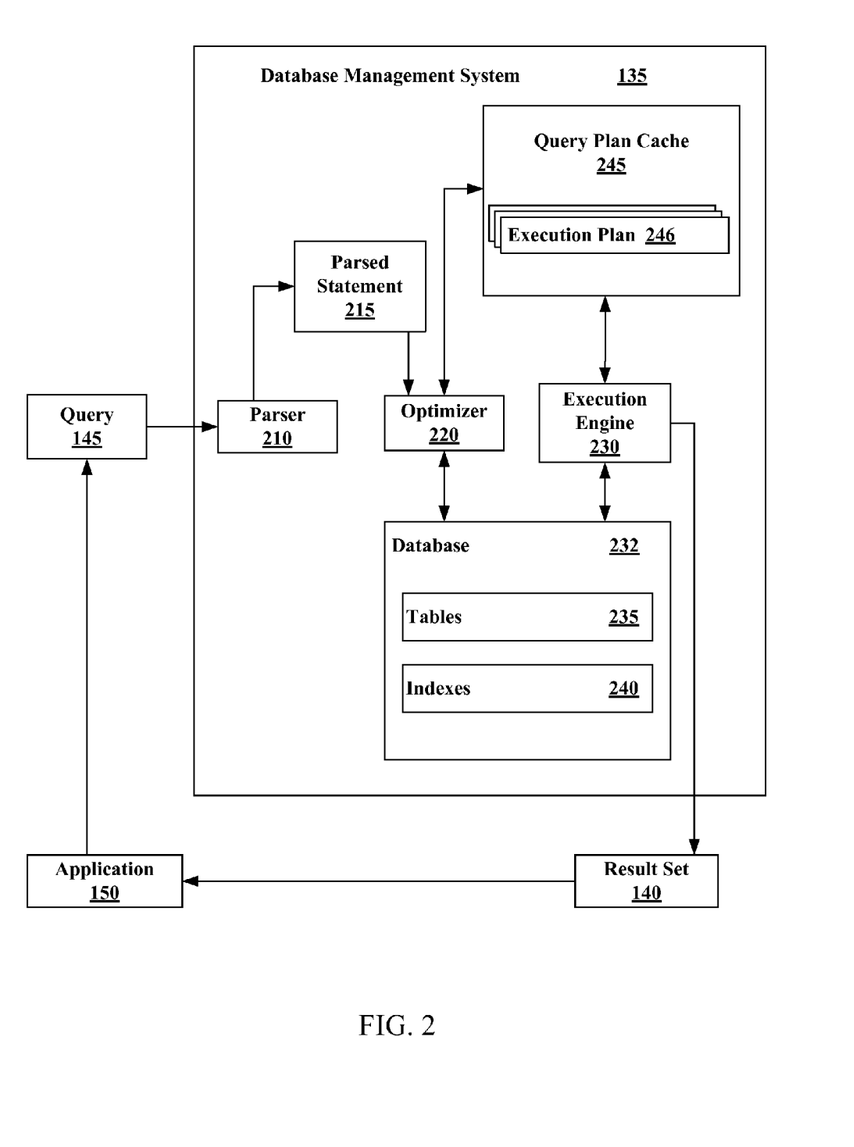
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246, which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

Figure 3:
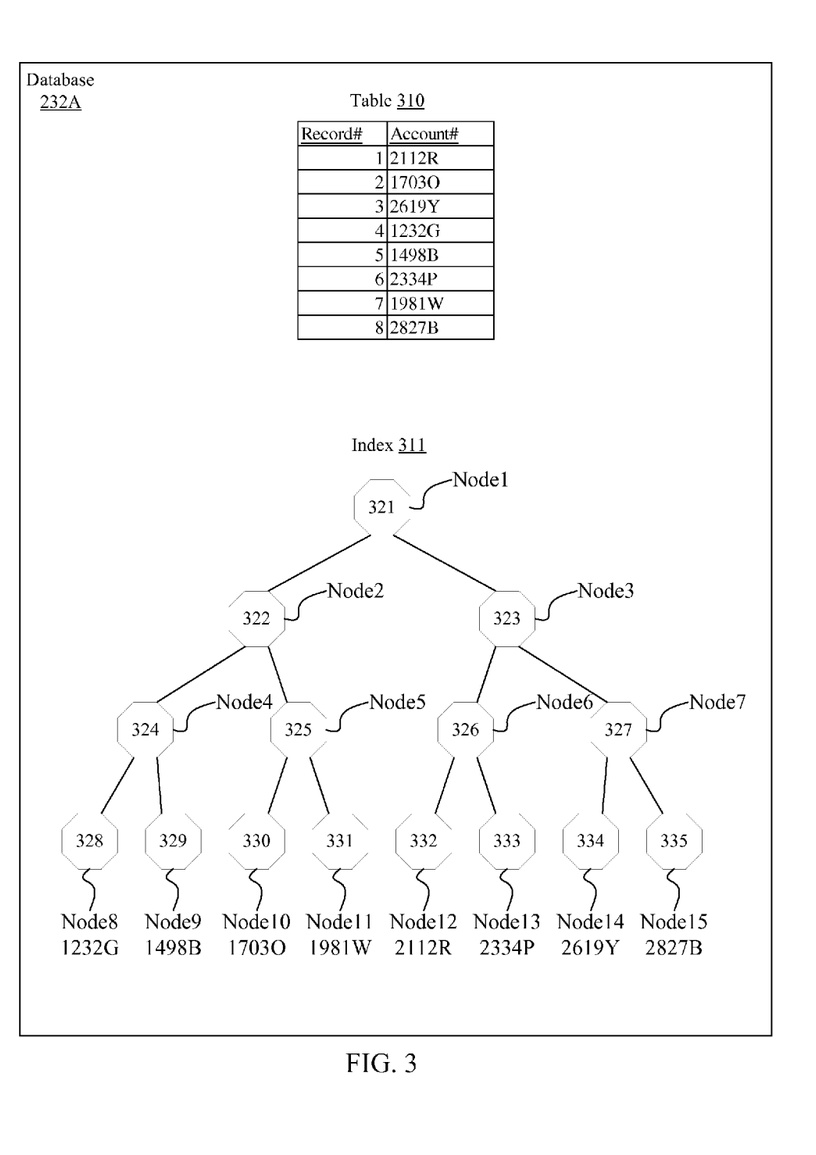
FIG. 3 illustrates an example database including a table and an index according to an embodiment.

FIG. 3 illustrates an example database 232A including a table 310 and an index 311. In embodiments, many rows and many columns may exist in the table 310. The table 310 may include a "Record#" column denoting record numbers and an "Account#" column denoting account numbers for customers. Each row may have a unique record number, represented by record numbers 1, 2, 3, 4, 5, 6, 7, 8 in table 310. Account numbers may correspond with the record numbers such as account numbers 2112R, 1703O, 2619Y, 1232G, 1498B, 2334P, 1981W, 2827B. Other possibilities for tables are considered.

The index 311 may be represented as a tree structure as in FIG. 3. The index 311 may include a collection of nodes labeled 321-335 for nodes 1-15. Each node may be a data structure which may include a value that may be a key value.

The index 311 may correlate to the table 310. In an embodiment, Node1 321 may include account numbers with values between 1001 and 3000. Node2 322 may be a child of Node1 321 and may include account numbers with values between 1001 and 2000. Node3 323 may be a child of Node1 321 and may include account numbers with values between 2001 and 3000. Node4 324 may be a child of Node2 322 and may include account numbers with values between 1001 and 1500. Node5 325 may be a child of Node2 322 and may include account numbers with values between 1501 and 2000. Node6 326 may be a child of Node3 323 and may include account numbers with values between 2001 and 2500. Node7 327 may be a child of Node3 323 and may include account numbers with values between 2501 and 3000. In index 311 of FIG. 3, Node8 has a value of 1232G and is labeled 328, Node9 has a value of 1498B and is labeled 329, Node10 has a value of 1703O and is labeled 330, Node11 has a value of 1981W and is labeled 331, Node12 has a value of 2112R and is labeled 332, Node13 has a value of 2334P and is labeled 333, Node14 has a value of 2619Y and is labeled 334, Node15 has a value of 2827B and is labeled 335. Node8 328 and Node9 329 may be children of Node4 324. Node10 330 and Node11 331 may be children of Node5 325. Node12 332 and Node13 333 may be children of Node6 326. Node14 334 and Node15 335 may be children of Node7 327. In an embodiment, the tree structure may be a binary search tree where the left subtree of Node1 321 contains only nodes with keys less than Node1's key, the right subtree of Node1 321 contains only nodes with keys greater than the Node1's key, both the left and right subtrees may also be binary search trees, and there may be no duplicate nodes. Other possibilities for indexes are considered.

Figure 4:
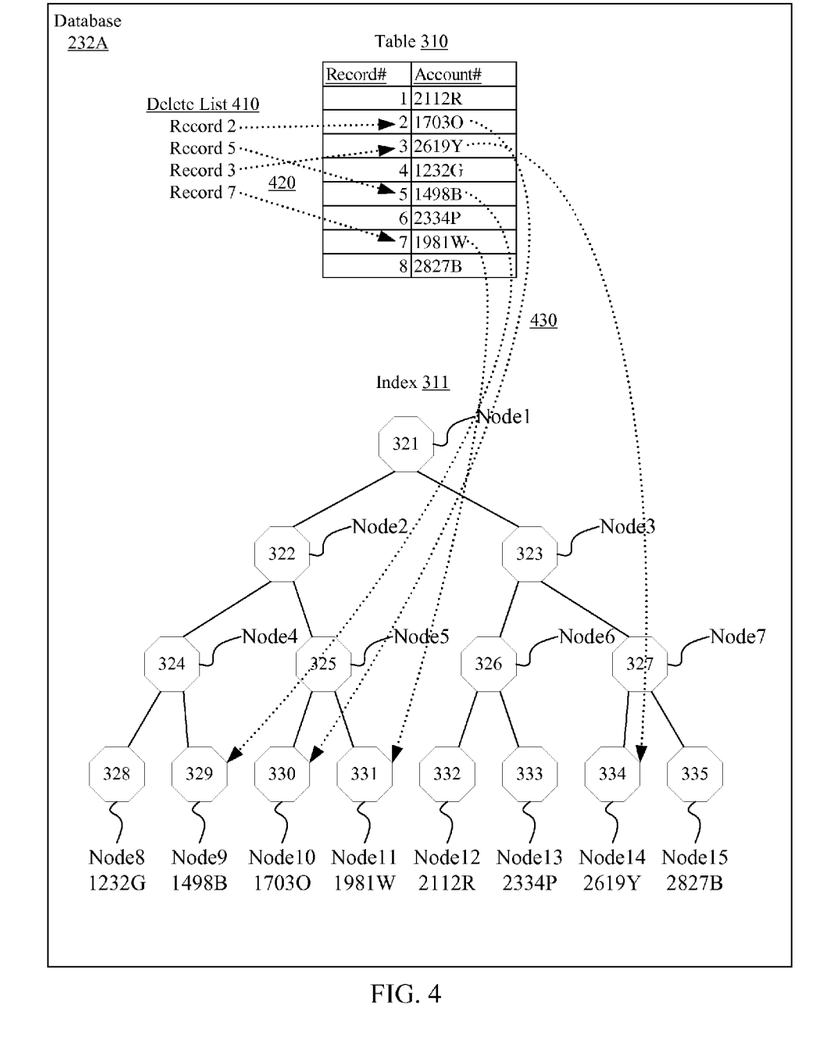
FIG. 4 shows a list of records to be deleted and the locations of the records in the example database according to an embodiment.

FIG. 4 shows a list of records to be deleted and the locations of the records in the example database 232A. A delete list 410 may represent records corresponding to rows a user wants to delete. Arrows 420 may represent how the order of the records to be deleted in delete list 410 may not be in the same order as the records in table 310. The fact that arrows 420 intersect for Record 3 and Record 5 depict the different orders. In embodiments, delete list 410 may represent values such as account numbers in table 310 a user wants to delete. For example, instead of delete list 410 consisting of records 2, 5, 3, 7 it may consist of account numbers 1703O, 1498B, 2619Y, 1981W. Thus, delete list 410 may include values of a column in associated rows in table 310.

Whether the delete list 410 represents records or account numbers, in the example above rows to be deleted to which arrows 420 point are identical. Key values in index 311 may relate or correspond to values of particular rows of table 310. Arrows 430 may represent how a value of a particular row of a particular column of table 310 may correlate to a key of index 311. In FIG. 4, the value 1703O in table 310 correlates to Node10 330 in index 311, the value 2619Y in table 310 correlates to Node14 334 in index 311, the value 1498B in table 310 correlates to Node9 329 in index 311, the value 1981W in table 310 correlates to Node11 331 in index 311.

Figure 5:
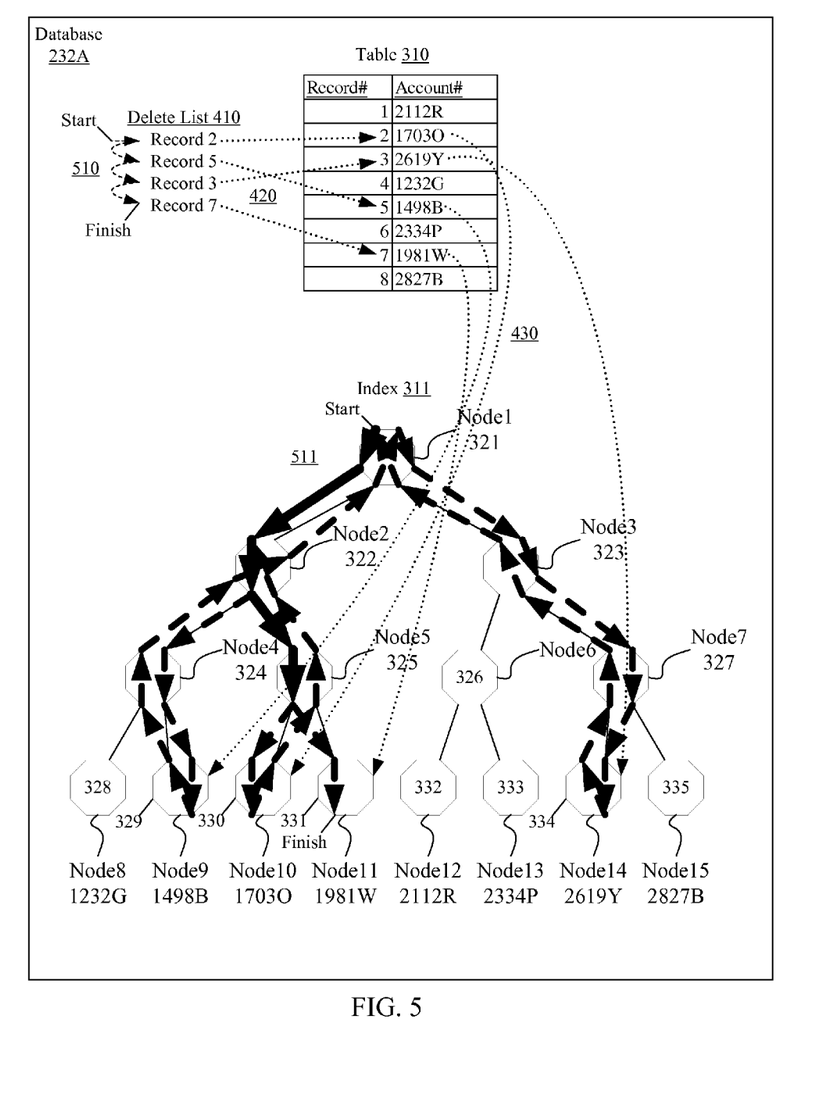
FIG. 5 illustrates maintenance on an index when deleting in an order of records a user wants to delete according to an embodiment.

FIG. 5 illustrates maintenance on an index when deleting in an order of records a user wants to delete. Aspects of FIG. 5 are the same as FIG. 4. Maintenance on the table 310 may be efficient when records corresponding to rows a user wants to delete such as delete list 410 are to be deleted in an order represented by arrows 510. As shown by arrows 510, a delete may start with the top record and finish with the bottom record. Each record may be quickly accessed by a direct record number lookup operation. Thus, records may be directly accessed in a manner similar to an array. Access to the table 310 may be efficient because the database 232A may "look ahead" by prefetching a row corresponding to a record to be deleted in delete list 410 before an actual delete occurs.

In contrast with maintenance on the table 310, maintenance on the index 311 may not be efficient when records a user wants to delete such as delete list 410 are to be deleted in an order represented by arrows 510. The delete operation may search from the top of the index tree traveling up and down a series of nodes to find a value to remove as depicted in FIG. 5. The effect may be a pattern of "jumping around" the index. A given node may need to be brought into memory more than once in a busy memory pool. For example, Node5 325 is a parent node to Node10 330 with the value 1703O corresponding to Record 2 and Node11 331 with the value 1981W corresponding to Record 7. In embodiments, using delete list 410 may include Node5 325 being brought into memory in the operation of deleting the value of Record 2 in Node10 330, Node5 being floated back out to disk and no longer in memory as Record 5 and Record 3 are deleted, and Node5 325 being brought back into memory in the operation of deleting the value of Record 7 in Node11 331. In embodiments with multiple indexes over a given table, each index may need to be searched on a single record delete. In such a situation, maintenance may become less efficient as a given node may be brought into memory many times.

Arrows 511 depict a delete operation searching the index tree using delete list 410 to delete in an order of records represented by arrows 510. First, to delete the row corresponding with the value of 1703O associated with Record 2, the database may look at Node1 321 then Node2 322 then Node5 325 and then Node10 330. Next, to delete the row corresponding with the value of 1498B associated with Record 5, the database may return up the tree to look at Node5 325 then Node2 322 then Node4 324 and then Node9 329. Next, to delete the row corresponding with the value of 2619Y associated with Record 3, the database may return up the tree to look at Node4 324 then Node2 322 then Node1 321 then Node3 323 then Node7 327 and then Node14 334. Lastly, to delete the row corresponding with the value of 1981W associated with Record 7, the database may return up the tree to look again at Node7 327 then again Node3 323 then again Node1 321 then again Node2 322 then again Node5 325 and then Node11 331. Maintenance may be less efficient in this way because nodes such as Node1 321, Node2 322, Node3 323, Node5 325, and Node7 327 may be brought into memory more frequently than necessary.

Figure 6:
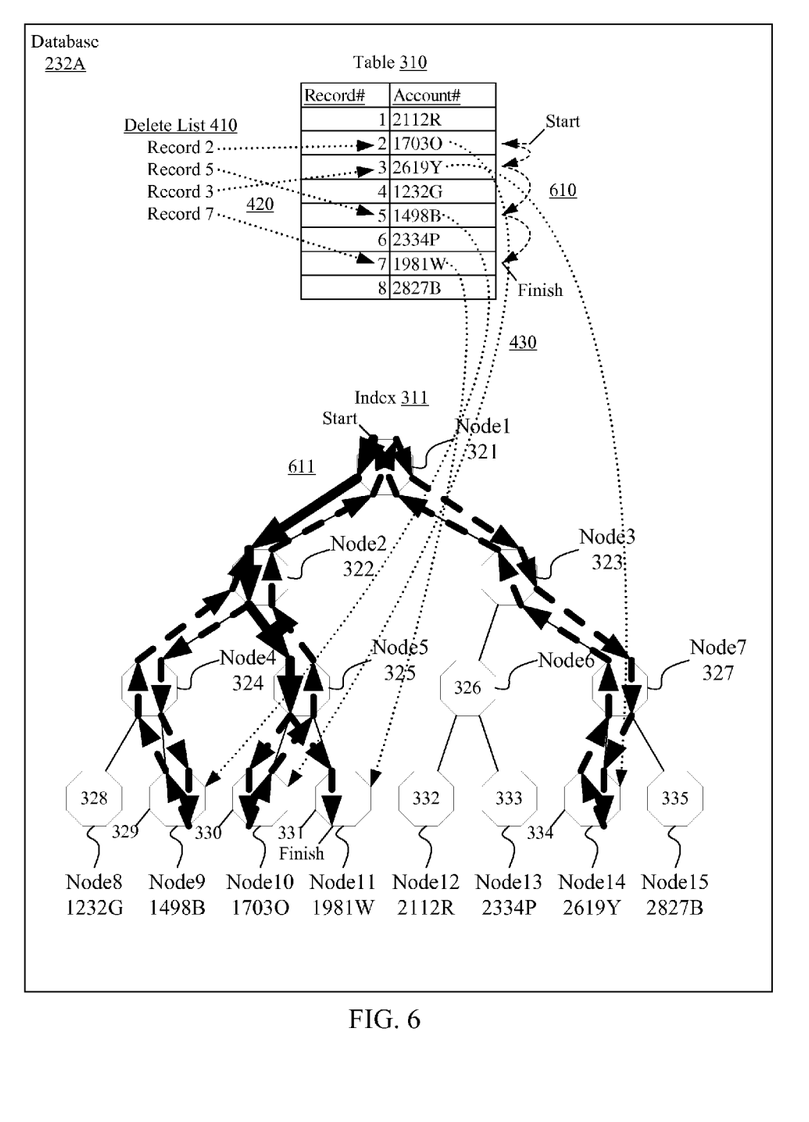
FIG. 6 illustrates maintenance on an index when deleting in an order of values a user wants to delete according to an embodiment.

FIG. 6 illustrates maintenance on an index when deleting in an order of values a user wants to delete. Aspects of FIG. 6 are the same as FIG. 4, 5. Maintenance on the index 311 may not be efficient when records corresponding to rows a user wants to delete such as delete list 410 are to be deleted in an order represented by arrows 610. Arrows 611 depict a delete operation searching the index tree using delete list 410 to delete in an order of values represented by arrows 610. First, to delete the row corresponding with the value of 1703O, the database may look at Node1 321 then Node2 322 then Node5 325 and then Node10 330. Next, to delete the row corresponding with the value of 2619Y, the database may return up the tree to look at Node5 325 then Node2 322 then Node1 321 then Node3 323 then Node7 327 and then Node14 334. Next, to delete the row corresponding with the value of 1498B, the database may return up the tree to look again at Node7 327 then again Node3 323 then again Node1 321 then Node2 322 then Node4 324 and then Node9 329. Lastly, to delete the row corresponding with the value of 1981W, the database may return up the tree to look at Node4 324 then again Node2 322 then again Node5 325 and then Node11 331. Maintenance may be less efficient in this way because nodes such as Node1 321, Node2

322, Node3 323, Node5 325, and Node7 327 may be brought into memory more frequently than necessary.

Figure 7:
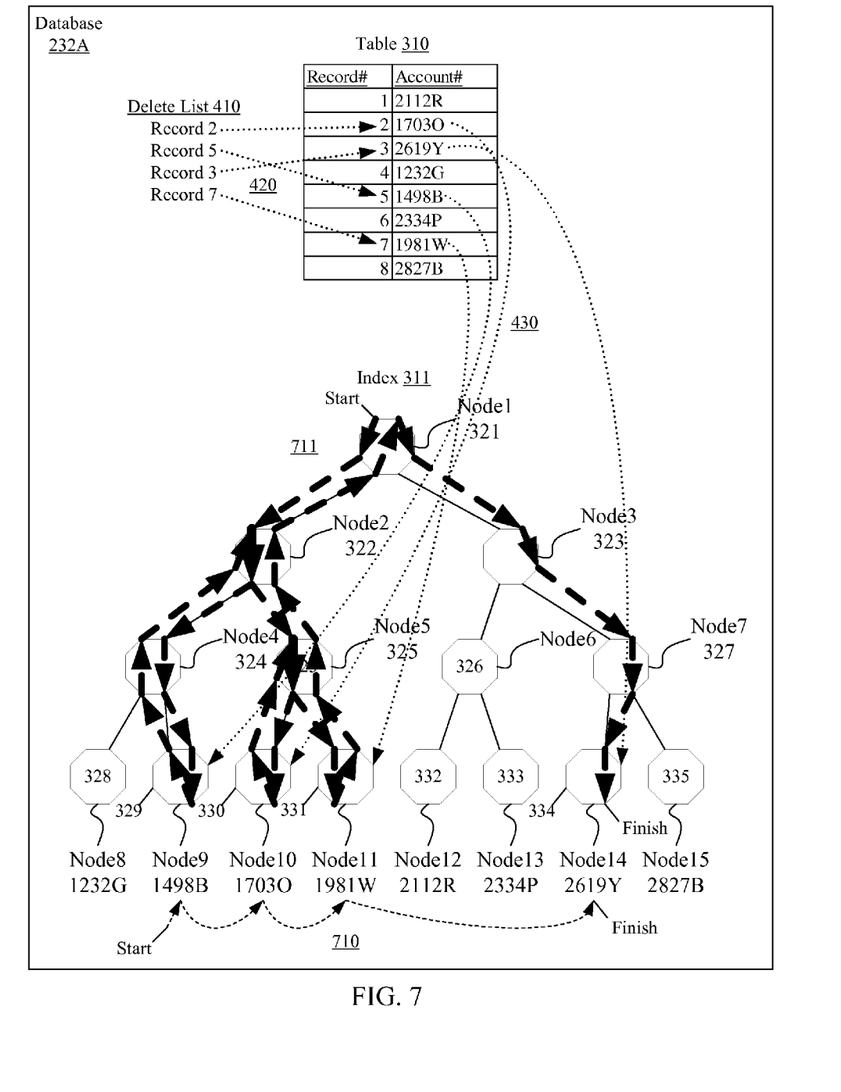
FIG. 7 illustrates maintenance on an index when deleting in an order of index key values a user wants to delete according to an embodiment.

FIG. 7 illustrates maintenance on an index when deleting in an order of index key values a user wants to delete. Aspects of FIG. 7 are the same as FIG. 4, 5, 6. Maintenance on the index 311 may be efficient when records corresponding to rows a user wants to delete such as delete list 410 are to be deleted in an order represented by arrows 710. Arrows 711 depict a delete operation searching the index tree using delete list 410 to delete in an order of index key values represented by arrows 710. First, to delete the row corresponding with the index key value of 1498B, the database may look at Node1 321 then Node2 322 then Node4 324 and then Node9 329. Next, to delete the row corresponding with the index key value of 1703O, the database may return up the tree to look at Node4 324 then Node2 322 then Node5 325 and then Node10 330. Next, to delete the row corresponding with the index key value of 1981W, the database may look at Node5 325 and then Node11 331. Lastly, to delete the row corresponding with the index key value of 2619Y, the database may return up the tree to look at Node5 325 then Node2 322 then Node1 321 then Node3 323 then Node7 327 and then Node14 334. Maintenance may be efficient by ordering using index key values because nodes may not be brought into memory more frequently than necessary. Ordering in this manner may not impact table maintenance because record number lookups may be the same as an array lookup (i.e. Order 1 search). In embodiments with tables having multiple columns and multiple indexes 240, the database 232 and the optimizer 220 may determine the appropriate order to efficiently perform the delete which may include minimizing memory I/O.

Figure 8:
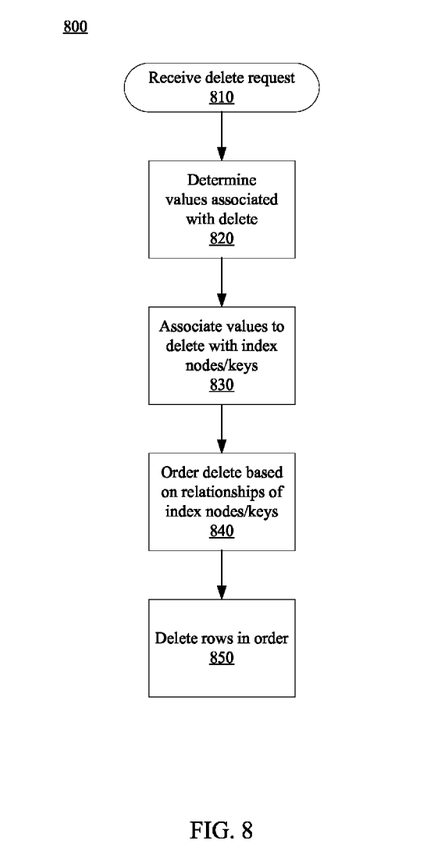
FIG. 8 is a flowchart illustrating an operation to manage a database according to an embodiment.

FIG. 8 is a flowchart illustrating an operation 800 to manage a database according to an embodiment. Operation 800 begins by receiving a delete request at block 810. The delete request 810 may be a SQL DELETE. In embodiments, the delete request may include a list of rows to delete such as delete list 410 which represents records a user wants to delete. In embodiments, the delete request may include values from columns such as account numbers as represented in table 310. The delete request may not have ordered the rows to be deleted in the most efficient order to delete. In particular, efficiency in terms of I/O may be the focus of operation 800.

Values associated with the delete request may be determined at block 820. For example, if the delete request 820 is received with a delete list 410 corresponding to records in a table 310, a translation to values such as account numbers in 310 may occur to determine the values associated with the delete request 820. In embodiments, a first column including a first set of values may include a delete list such as 410 that then may be translated to a second column including a second set of values in the same rows. In effect, this is what arrows 420 in FIG. 4 show. In a table with many rows and columns with many potential indexes, the concept remains the same. Block 830 may associate values to delete with index nodes or keys. The values from block 820 may be associated not only with related rows of the table of the database but also with nodes or keys of an index. Such keys may have key values which may be the values as in block 820. In effect, this is what arrows 430 in FIG. 4 show. In embodiments, values from a table may be associated with key values of multiple indexes.

Block 840 may order the delete based on relationships of index nodes or keys. In effect, this is what arrows 710 in FIG. 7 show. A comparatively closely related relationship may occur when a first relationship between a first key or node and a baseline key or node is relatively closer than a second relationship between a second key or node and the baseline key or node. The baseline key or node may be a key or node being searched by operation 800. The order may be a hierarchical order which may include values in parent keys being deleted before values in child keys, from the top of an index tree to the bottom of the index tree as the operation 800 searches through the keys. In this case, the parent key may be considered to be a comparatively closely related relationship. The order may be a spatial locality order which may include deleting a near key that is in a nearby location as opposed to a far key located farther away relative to a search key that operation 800 is searching through. The near key may be adjacent to the search of operation 800, or at least may be closer than the far key in terms of a fewer number of "jumps" it may take to get to the near key from the search key. In this case, the near key may be considered to be a comparatively closely related relationship. The order may be a temporal locality order which may include deleting a loaded key that is included in memory, perhaps with a search key, during the search of operation 800 before an unloaded key that is not included in memory. In this case, the loaded key may be considered to be a comparatively closely related relationship. The order may be a frequency order which may include deleting a frequent key that is frequently accessed to memory before deleting an infrequent key that is not accessed to memory as frequently as the frequent key. The frequent key and the infrequent key may be related to a search key that may be performing the search of operation 800. In the case of a frequency order, the frequent key may be considered to be a comparatively closely related relationship.

A comparatively closely related relationship may also occur when comparing relationships, as above, across more than one index. Indexes with more data or more unique values may have a greater chance of random access to memory. The order may take into account multiple indexes so that the order may include a volume order which may include deleting keys first in a large index that has a greater number of rows than a small index that has a lesser number of rows. In this case, keys in the large index may be considered to be a comparatively closely related relationship. The order may take into account multiple indexes so that the order may be a cardinality order which may include deleting keys first in a big index that has a greater quantity of unique values than a little index that has a lesser quantity of unique values. In this case, keys in the big index may be considered to be a comparatively closely related relationship. In the described embodiments with multiple indexes, a baseline index that may be of an average number of rows or number of unique values may be considered when comparing. The ordering done in block 840 may take into consideration the expense of the I/O for the indexes being maintained instead of merely the I/O on the table from which rows are being deleted.

Block 850 may delete rows of the delete request from block 810 in the order from block 840. The deleting of rows in database tables may occur by deleting keys in indexes. The keys in indexes being deleted may correspond to rows in the database tables. By identifying key values, identifying keys or nodes containing the key values, and deleting the keys containing the key values, the corresponding rows in the database tables may be deleted. Maintenance efficiency may result from ordering the values to be deleted using indexes. Such efficiency may replace potentially inefficient operations such as deleting rows from a table in an order the rows arrived to the table. In total, operation 800 may serve to reduce I/O to process a DELETE statement and shorten overall runtime. Further, maintenance may occur in real-time while applications remain active.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A system comprising:
one or more processors; and
program code including a query optimizer, the program code configured to be executed by the one or more processors to process a database query, the program code configured to:
structure a database to have a plurality of database tables having an indexes associated with one or more rows and having one or more index keys with index key values associated with particular rows of the one or more rows, wherein the indexes are organized as a search tree; and
delete rows in the database tables for database maintenance in real-time by deleting index keys of the one or more rows in the database tables, wherein:
the database is managed by deleting one or more index keys in the database tables,
the deleting the index keys of the one or more index keys in the database further includes deleting index keys of the one or more index keys in the one or more indexes related to the rows of the one or more rows in an order such that corresponding rows of the one or more rows are deleted based on a comparatively close relationship to the one or more index keys, and
the comparatively close relationship is a minimum number of jumps necessary to get from a row associated with a near key to a row associated with a search key.

2. The system of claim 1, wherein the order rows are deleted includes at least one of a hierarchical order of index keys in indexes, a spatial locality order of index keys in indexes which includes prioritizing an index key that is in a nearby location, a temporal locality order of index keys in indexes which includes prioritizing an index key that is in a memory, and a frequency order of index keys in indexes which includes prioritizing an index key that is frequently accessed to a memory.

3. The system of claim 1, wherein the order rows are deleted includes at least one of a volume order of index keys in indexes which includes prioritizing index keys in a first index that has a greater number of rows than a second index and a cardinality order of index keys in indexes which includes prioritizing index keys in a third index that has a greater quantity of unique values than a fourth index.

4. A computer program product for processing a database query, the computer program product comprising a non-transitory computer readable storage medium having program code embodied therewith, the program code comprising computer readable program code that is configured to:
structure a database to have a plurality of database tables having an indexes associated with one or more rows and having one or more index keys with index key values associated with particular rows of the one or more rows, wherein the indexes are organized as a search tree; and
delete rows in the database tables for database maintenance in real-time by deleting index keys of the one or more rows in the database tables, wherein:
the database is managed by deleting one or more index keys in the database tables,
the deleting the index keys of the one or more index keys in the database further includes deleting index keys of the one or more index keys in the one or more indexes related to the rows of the one or more rows in an order such that corresponding rows of the one or more rows are deleted based on a comparatively close relationship to the one or more index keys, and
the comparatively close relationship is a minimum number of jumps necessary to get from a row associated with a near key to a row associated with a search key.

5. The computer program product of claim 4, wherein the order rows are deleted includes at least one of a hierarchical order of index keys, a spatial locality order of index keys, which includes prioritizing an index key that is in a nearby location, a temporal locality order of index keys, which includes prioritizing an index key that is in a memory, and a frequency order of index keys, which includes prioritizing an index key that is frequently accessed to a memory.

6. The computer program product of claim 4, wherein the order rows are deleted includes at least one of a volume order of index keys, which includes prioritizing index keys in a first index that has a greater number of rows than a second index and a cardinality order of index keys, which includes prioritizing index keys in a third index that has a greater quantity of unique values than a fourth index.

7. The computer program product of claim 4, wherein the one side of the tree is a leftmost side of the tree.

8. The computer program product of claim 4, wherein the one side of the tree is a rightmost side of the tree.

9. The computer program product of claim 4, wherein jumps are movements between nodes up or down the index.

10. The computer program product of claim 4, wherein the search tree is a binary search tree.

11. A system comprising:
one or more processors; and
program code including a query optimizer, the program code configured to be executed by the one or more processors to process a database query, the program code configured to:
structure a database to a have a plurality of tables having indexes to related rows and having keys associated with particular rows, the database including a first table and a first index for accessing the first table, the first index being organized as a search tree having a plurality of nodes, the plurality of nodes including a plurality of lower-most child nodes, each lower-most child node storing a key corresponding with a row of the first table; and delete three or more rows in the first table by deleting keys in corresponding lower-most child nodes of the first index in a first order, the first order beginning at a first lower-most child node to be deleted, the first lower-most child node being a node closest to one side of the tree, the first order including a first subsequent node to be next deleted after the first lower-most child node, the first subsequent node being a second lower-most child node reachable from the first lower-most child node in a first number of jumps in the tree, wherein a second number of jumps from the second lower-most child node is required to reach a third lower-most child node to be deleted, wherein the first number of jumps is fewer than the second number of jumps.

12. The system of claim 11, wherein the one side of the tree is a leftmost side of the tree.

13. The system of claim 11, wherein the one side of the tree is a rightmost side of the tree.

14. The system of claim 11, wherein jumps are movements between nodes up or down the index.

15. The system of claim 11, wherein the search tree is a binary search tree.

* * * * *